United States Patent
Katagiri

(10) Patent No.: US 6,778,069 B1
(45) Date of Patent: Aug. 17, 2004

(54) RADIO SELECTIVE-PAGING SYSTEM AND DISPLAY METHOD THEREFOR

(75) Inventor: Atsushi Katagiri, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/545,069

(22) Filed: Apr. 7, 2000

(30) Foreign Application Priority Data

Apr. 9, 1999 (JP) .......................................... 11-102710

(51) Int. Cl.[7] ................................................ H04Q 7/00
(52) U.S. Cl. ..................... 340/7.55; 340/7.51; 340/7.52
(58) Field of Search ................................ 340/7.55, 825, 340/7.52, 7.51

(56) References Cited

U.S. PATENT DOCUMENTS

| | | | |
|---|---|---|---|
| 5,473,320 A | * 12/1995 | DeLuca et al. | 340/7.51 |
| 5,629,688 A | * 5/1997 | Muramatsu et al. | 340/7.47 |
| 5,739,764 A | 4/1998 | Ide et al. | |
| 5,872,521 A | * 2/1999 | Lopatukin et al. | 340/7.52 |
| 5,936,548 A | * 8/1999 | Takatsuka | 340/7.52 |
| 5,966,113 A | * 10/1999 | Hidaka et al. | 340/7.55 |
| 6,060,998 A | * 5/2000 | Miyashita | 340/7.55 |
| 6,069,568 A | * 5/2000 | Tsuchiyama | 340/7.55 |
| 6,211,795 B1 | * 4/2001 | Izuta | 340/7.52 |
| 6,429,772 B1 | * 8/2002 | Lizzi | 705/26 |
| 6,459,359 B1 | * 10/2002 | Miyashita | 340/7.51 |
| 2003/0011468 A1 | * 1/2003 | Asai et al. | 340/7.55 |

FOREIGN PATENT DOCUMENTS

| | | |
|---|---|---|
| CN | 1115157 A | 1/1996 |
| EP | 0 829 836 A1 | 3/1998 |
| JP | 9-266586 | 10/1997 |
| JP | 10-94006 | 4/1998 |
| JP | 11-75231 | 3/1999 |

* cited by examiner

*Primary Examiner*—Michael Horabik
*Assistant Examiner*—Clara Yang
(74) *Attorney, Agent, or Firm*—Pearne & Gordon LLP

(57) ABSTRACT

A selective calling signal and a received message signal are received via a radio receiver unit 1 and a decoder unit 2. The received message from the radio receiver unit 1 is stored in a message storing unit 3. The received message stored is displayed on a screen of a display unit 4 based on the display operation of an operating unit 6 under control of a controller unit 8. At this time, an adder unit 5 adds and counts the piece number of the received messages, which are newly received during a period from the display operation to the succeeding display operation, for every attribute category displayed during the screen display of the received message on the display unit 4. Then, information of the adder unit (the piece number of the new unread received messages per attribute category) is displayed on the screen of the display unit 4 under control of the controller unit 8.

12 Claims, 5 Drawing Sheets

— VACANT SEAT INFORMATION — (AT 10:00)
  THEATER 001: 11:00 ~ ○
  THEATER 002: 11:00 ~ ○

— VACANT SEAT INFORMATION — (AT 10:00)
  THEATER 001: 11:00 ~ ○
  THEATER 002: 11:00 ~ ○

— VACANT SEAT INFORMATION — (AT 10:10)
  THEATER 001: 11:00 ~ △
  THEATER 002: 11:00 ~ ○

— VACANT SEAT INFORMATION — (AT 10:10)
  THEATER 001: 11:00 ~ △
  THEATER 002: 11:00 ~ ○

— VACANT SEAT INFORMATION — (AT 10:30)
  THEATER 001: 11:00 ~ △
  THEATER 002: 11:00 ~ ✕

*FIG. 5A*

10:10 START   10:00 END   10:15 ADDITION
A
☆
1

– VACANT SEAT INFORMATION – (AT 10:00)
THEATER 001: 11:00 ~ ○
THEATER 002: 11:00 ~ ○

*FIG. 5B*

10:10 START   10:00 END   10:15 ADDITION
A

0

– VACANT SEAT INFORMATION – (AT 10:00)
THEATER 001: 11:00 ~ ○
THEATER 002: 11:00 ~ ○

*FIG. 5C*

10:20 START   10:00 END   10:15 ADDITION
A
☆
6

– VACANT SEAT INFORMATION – (AT 10:10)
THEATER 001: 11:00 ~ △
THEATER 002: 11:00 ~ ○

*FIG. 5D*

10:20 START   10:00 END   10:15 ADDITION-FREE
A
☆
4

– VACANT SEAT INFORMATION – (AT 10:10)
THEATER 001: 11:00 ~ △
THEATER 002: 11:00 ~ ○

RADIO SELECTIVE-PAGING SYSTEM AND DISPLAY METHOD THEREFOR

BACKGROUND OF THE INVENTION

The present invention relates to a radio selective-paging system having a display function for displaying received message information on a screen, and a display method therefor.

The recent radio selective-paging system (pager) can receive a phone number, a short message, etc. from the calling side to then display thereof on the screen and also selectively receive various information provided from a manager of a calling communication network to then display thereof on the screen. For example, various information services such as news, weather forecast, stock information, etc. are provided from the manager of the calling communication network, and then the radio selective-paging system receives the received message of these information and selectively displays thereof on the screen.

As such radio selective-paging system, there is disclosed a system as an example, which has various functions for displaying the received messages which have not been read by the user yet (referred appropriately to as "unread received message" hereinafter) on the screen to check various information (received messages) without fail. For instance, in the Japanese Patent No. 2748712 and the Unexamined Japanese Patent Application Publication No. Hei 10-126824, there is disclosed a system which can prevent the user side from forgetting to read the received message by issuing the calling once again.

Also, in the Unexamined Japanese Patent Application Publication Nos. Hei 4-320119 and Hei 5-95322, and the Japanese Patent No. 2765348, there is disclosed the system which can issue information such that it prevents the user from forgetting to read the received message when the user straps on or unstraps his or her watch, or the user holds the radio selective-paging system by his or her hand or opens a lid of the system, etc. Further, in the Unexamined Japanese Patent Application Publication No. Hei 6-61920, and the Unexamined Japanese Utility Model Application Publication Nos. Hei 2-43035 and Hei 2-43037, there is disclosed the system which can inform the user at the alarm informing time, exactly at every hour, etc. such that it prevents the user from forgetting to read the received message. Moreover, in the unexamined Japanese Patent Application Publication No. Hei 10-94006, there is disclosed the system which enables the user to easily check the attributes of remaining unread received messages including, the information category and piece number of the message, for example.

In the above radio selective-paging system, among the unread received messages supplied from the information services, such as news, weather forecast, stock information, etc., are necessary received messages, which correspond to the latest received message and a plurality of received messages containing the preceding received message. However, there is such a problem that, since an alarm is also issued to inform the user of the unread received messages such as old messages, which are of no value for the user, the above-mentioned system in the prior art is inconvenient for the user to handle.

SUMMARY OF THE INVENTION

The present invention has been made to overcome such subjects in the prior art, and it is an object of the present invention to provide a radio selective-paging system which is capable of easily recognizing the piece number of unread received messages available for the user among received messages out of a large number of provided information, and also easily finding the unread received messages to improve the convenience for the user to use, and a display method therefor.

In order to achieve the above object, the radio selective-paging system set forth in aspect 1 of the present invention, comprises a radio receive processing means for receiving a selective calling signal and a message signal and storing message information based on the message signal; a message display processing means for reading stored message information in response to a display operation to display such message information; and a piece number-of-message display processing means for displaying piece numbers of new message information received during a period from the display operation to a succeeding display operation every attribute.

Also, the radio selective-paging system set forth in aspect 2 of the present invention, comprises a radio receiving means for receiving a selective calling signal and a message signal via radio; a message storing means for storing message information based on the message signal received by the radio receiving means; a displaying means for displaying the message information on a screen; an operating means for performing an display operation to display the message information on the screen; an adding means for adding piece numbers of new message information received until a succeeding display operation is performed after the message information have been displayed every attribute based on the display operation of the operating means, to count thereof; and a display controlling means for causing the displaying means to display a piece number of new message information counted by the adding means every attribute when the succeeding display operation is performed.

The display method for the radio selective-paging system set forth in aspect 3 of the present invention, comprises a radio receiving step of receiving a selective calling signal and a message signal via radio; a message storing step of storing message information based on the message signal received; a displaying step of displaying the message information on a screen; an adding step of adding piece numbers of new message information received until a succeeding display operation is performed after the message information have been displayed every attribute, in response to a display operation, to count thereof; and a piece number-of-message displaying step of displaying a piece number of new message information counted every attribute when the succeeding display operation is performed.

Also, the display method for the radio selective-paging system set forth in aspect 4 of the present invention, comprises a radio receiving step of receiving a selective calling signal and a message signal via radio; a message storing step of storing message information based on the message signal received; a displaying step of displaying the message information on a screen; an adding step of setting a predetermined adding period and then adding piece numbers of new message information received during the adding period for every attribute, in order to obtain a count thereof; and a piece number-of-message displaying step of displaying piece numbers of new message information for every attribute counted above.

In the radio selective-paging system set forth in aspects 1 and 2 and the display method for the radio selective-paging system set forth in aspect 3 of the present invention, the message information is stored based on the received message signal, then stored message information are read and displayed according to the display operation, and then the piece number of the new message information received from the display operation to the succeeding display operation is displayed for every attribute. Therefore, the user can easily check the piece number of every attribute (e.g. news) of the unread received messages among many information services such as the received messages, news, weather forecasts, stock information, and vacant seat information in the theaters, for example. As a result, the user can easily find the necessary unread received messages, and the convenience to handle a plurality of unread received messages can be improved.

In the display method for the radio selective-paging system set forth in aspect 4 of the present invention, the message information are stored based on the received message signal, then stored message information are read and displayed according to the display operation, and then the piece number of the message information received in the predetermined period is displayed. Therefore, the user can always easily and effectively check the piece number of the unread received messages for every attribute among the received message in the many information services. As a result, the user can easily find the necessary unread received messages, and the convenience in handling a plurality of unread received messages can be improved.

In the screen display, for example, the information contents of the received messages are displayed on the screen together with the mark for partitioning the attributes of the information contents of the received messages, the mark indicating that the information contents of the received messages have not been read yet, and the numerals indicating the piece number of the unread received messages. For example, if the already-read instruction operation indicating that the user has read the received messages is conducted, the numeral indicating the piece number of the unread received messages is decremented on the screen, and the mark indicating the unread state of the received messages is cleared when all unread received messages are read, and the numeral indicating the piece number of the unread received messages is updated into "0".

As the display operation to display the received messages, the instruction input employed to display the new received messages on the screen can be recognized by, for example, the already-read instruction operation indicating that the user has read the received messages, the unread reading operation by which displays the received messages on the screen, the display clearing operation which clears the screen display of the received messages on the display unit, etc.

Not only is the piece number of the unread received messages for all attributes displayed on the screen, but also, the piece number of the unread received messages according to groups in which the attributes are collected may be displayed, otherwise a piece number representing the total number of unread received messages may be displayed. In addition, all piece numbers of the unread messages instead of the piece number of the received messages received between the display operations or received in the predetermined adding period may be displayed on the screen.

The screen display which is fitted for the situation can be selected by changing appropriately the screen display according to the employed situation, the choice of the user, etc. As a result, the convenience to handle can be improved.

BRIEF DESCRIPTION OF THE DRAWINGS

FIGS. 2A to 2E are views showing display examples on a display screen in an operation according to the first embodiment.

FIGS. 5A to 5D are views showing display examples on a display screen in an operation according to the second embodiment.

DETAILED DESCRIPTION OF THE PREFERRED EMBODIMENTS

Embodiments of the present invention will be explained in detail with reference to the accompanying drawings hereinafter.

First Embodiment

Figure 1:
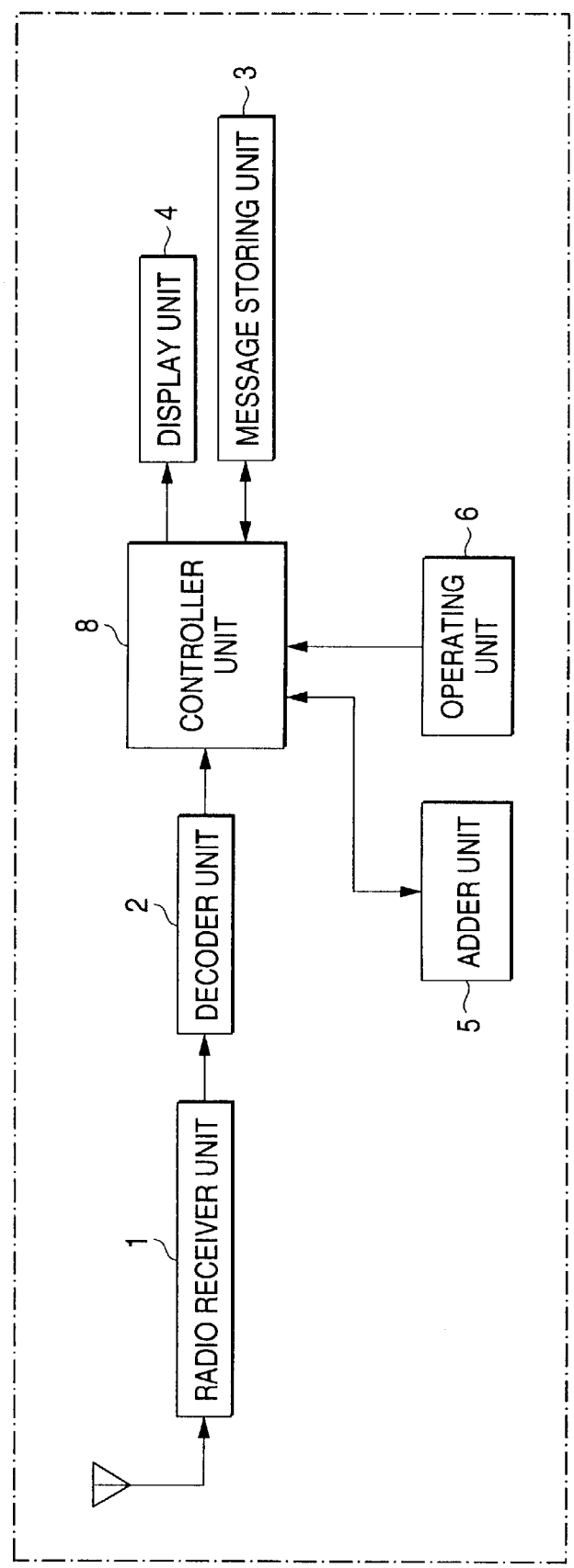
FIG. 1 is a block diagram showing a configuration of a radio selective-paging system according to a first embodiment of the present invention.

FIG. 1 is a block diagram showing a configuration of a radio selective-paging system according to a first embodiment of the present invention.

In FIG. 1, the radio selective-paging system according to the first embodiment comprises a radio receiver unit 1 which receives a general calling radio wave from a base station via an antenna and then demodulates a selective calling signal and a received message both issued for own device, and a decoder unit 2 which executes decoding process to decide whether or not the own selective calling signal in a demodulated signal sent out from the radio receiver unit 1 coincides with identification (ID) code data stored in a ROM (not shown), etc. and then, if yes, accepts the calling assigned to the own device to then output the received message.

Also, the radio selective-paging system comprises a message storing unit 3 which consists of a flash memory, etc. and stores the received message, a display unit 4 which consists of a liquid crystal display (LCD) for displaying the received message and contents of operation instructions on a screen, a light emitting diode (LED) for indicating the selective calling assigned to the own device by flashing display, and a speaker generating an intermittent sound as a sound display, and the like, and an operating unit 6 which has button switches used to perform various operations, e.g., power supply on/off, reading of the stored received message, etc. In addition, the radio selective-paging system comprises an adder unit 5 and a controller unit 8. The adder unit 5 adds and counts a piece number of new unread received messages which are received during a period beginning after the display operation has been carried out to read the received message stored by the user and display the received message on the screen, until the display operation is carried out once again. The controller unit 8 controls respective units to carry out the radio-selective calling process, the screen displaying process of the received message, etc., and particularly to carry out various controls according to embodiments of the present invention.

Next, an operation of the radio selective-paging system according to the first embodiment will be explained hereunder. First, an operation of the configuration shown in FIG. 1 will be explained.

The radio receiver unit 1 received the general calling radio wave from the base station via the antenna, performs processes such as high frequency amplification, frequency conversion, intermediate frequency amplification, etc., demodulates the selective calling signal assigned to the own device and the received message, and sends out thereof to the decoder unit 2. The decoder unit 2 executes the decoding process to decide whether or not the own selective calling signal in the demodulated signal sent out from the radio receiver unit 1 coincides with the ID code date stored in the ROM (not shown), etc., and then outputs the received message to the controller unit 8 if both coincide with each other. The controller unit 8 executes the control to store the received message in the message storing unit 3 and at the same time executes the control to display the received message on the screen of the display unit 4. In addition, the controller unit 8 causes the adder unit 5 to add and count the piece number of the received messages for every attribute based on the attribute information contained in the received messages. When the user applies the already-read instruction operation to the operating unit 6, the adder unit 5 clears the counted value to zero, and then adds the piece number of the received messages after the already-read instruction operation for every attribute.

In the event that a plurality of received messages are received for one attribute, the user carries out the display operation by using the operating unit 6 to issue the instruction such that one received message is displayed on the display unit 4 and then the next received message is displayed after one received message has been checked. At that time, the counted value of the adder unit 5 is decremented by one, and then the decremented counted value is displayed on the display unit 4. Accordingly, the user can confirm how many unread messages of a plurality of received messages still remain.

Next, an operation of the first embodiment of the present invention will be explained in detail hereunder. FIG. 2 is a view showing display examples on the display screen in the operation according to the first embodiment. Here the case where vacant seat information of the theater is displayed as the received message among various information services provided will be explained as an example.

In FIGS. 1 and 2, for example, if "vacant seat information" of the theaters contained in the received message is selected by operating the operating unit 6, the screen shown in FIG. 2A is displayed on the display unit 4. A current time "10:00" is displayed on the first line of the screen of the display unit 4. A category mark "A" indicating the information attribute on the current screen is displayed on the second line of the screen. Also, a mark "☆" indicating that the received message has not been read yet is displayed on the third line of the screen of the display unit 4. Further, a numeral "1" which is the piece number of the unread received messages counted by the adder unit 5 is displayed on the fourth line of the screen. The information contents of the received messages are displayed from the fifth line to the seventh line below a lateral line of the screen. In this example, "Vacant Seat Situation at a time 10:00 in the Theater 001 and the Theater 002" is displayed on the screen by using the marks such as "○", etc.

Under the display state of the screen in FIG. 2A, when the user applies the already-read instruction operation, which indicates that the received message being displayed on the screen has been read by the user, to the operating unit 6 as the display operation, the mark "☆" displayed on the third line to indicate that the received message has not been read yet is cleared, and thus the piece number of the unread received messages displayed on the fourth line is changed into "0", as shown in FIG. 2B. The screen display in FIG. 2C shows that new ten messages are received from a point of time when the screen display in FIG. 2B is displayed at a current time "10:20" but they have not been read yet, and that "Vacant Seat Situation at a time 10:10 in the Theater 001 and the Theater 002" which is the latest received message out of ten unread messages.

Then, the screen display in FIG. 2D shows the state wherein the mark "☆" displayed on the third line to indicate that the received message has not been read yet is cleared since the user has input the already-read instruction operation, which indicates that the received message of "Vacant Seat Situation at a time 10:10 in the Theater 001 and the Theater 002" being displayed on the screen in FIG. 2C has been read by the user, into the operating unit 6. In this screen display, the piece number of the unread received messages displayed on the fourth line is changed from "10" to "9".

Then, the ninth unread received message is older than the message "Vacant Seat Situation at a time 10:10 in the Theater 001 and the Theater 002", for example, and thus this message is the received message unnecessary for the user. In such case, while holding the screen display in FIG. 2D, the user does not particularly apply the already-read instruction operation so as to display the older unread received message as the display operation. As already described, since the user has applied the already-read instruction operation to the operating unit 6, the adder unit 5 counts the piece number of the received messages when the received message is further received newly from this state, and then causes to display the piece number of the received messages received after the already-read instruction operation has been issued on the fourth line of the screen.

The screen display in FIG. 2E shows the state wherein two new received messages are received after the screen display in FIG. 2D, and the mark "☆" displayed on the third line to indicate that the received messages have not been read yet and the piece number "2" of the unread received messages displayed on the fourth line are displayed on the screen, and that "Vacant Seat Situation at a time 10:30" which is the latest received message out of two received messages is displayed on the screen.

Based on the screen display in FIG. 2E, the user can understand clearly that two unread messages received after the screen display in FIG. 2D should be read.

According to the first embodiment, concerning the received messages such as many information services, e.g., news like stock price, exchange, etc., weather forecast, vacant seat information of the theaters, etc., which are transmitted successively to the radio selective-paging system, the piece number of the unread received messages can be counted and displayed for every attribute. Then counted value in the adder unit 5 can be cleared to zero when the already-read instruction operation is applied to the operating unit 6, and the piece number of the unread received messages received thereafter can be counted and displayed on the display unit 4. Therefore, the received messages that are older than the already-read instruction operation cannot be handled as the unread received messages. Only the received messages that are newer than the already-read instruction operation can be counted as the unread received messages and displayed on the display unit 4. As a result, the unread received messages necessary for the user can be easily found, so that the convenience of the device for the user to handle can be improved.

Other character strings or marks may be employed as the mark "☆" indicating that the received messages have not been read yet. For instance, the screen display may be employed in which a pattern of an "Envelop Mark", etc. are displayed by the number corresponding to the unread piece number in combination with the information of the piece number of the unread received messages. In addition, although "the already-read instruction operation indicating that the user has read the received messages" is mainly applied as the screen operation to display the received messages in the first embodiment, this operation may be employed together with an "unread reading operation by which the user displays the received messages on the screen", a "display clearing operation by which the user clears the screen display of the received messages on the display unit", etc.

Next, another operation according to the first embodiment will be explained hereunder. FIG. 3 is a view showing display examples on the display screen in another operation according to the first embodiment. In this case, the case will be explained as an example where the vacant seat information of the theaters, the weather forecast, and the news among various information service provide are displayed respectively as the received messages.

In FIG. 3, the category mark "A" of the attribute indicates the vacant seat information attribute, the category mark "B" indicates the weather forecast, and the category mark "C" indicates the news. In FIG. 3A, for example, the mark "☆" indicating that the "vacant seat information" have not been read yet, which is currently located below the category mark "A", and the piece number "1" of the unread received message of the "Vacant Seat Information" located below the mark "☆" are displayed on the display unit 4. Also, the piece number "3" of the unread received message of the "Weather Forecast" are displayed below the category mark "B". In addition, when the "Vacant Seat Information" in the theaters is selected by operation the operating unit 6, the contents of the received message of the vacant seat information are displayed on the fifth to seventh lines of the display unit 4.

Figure 3A:
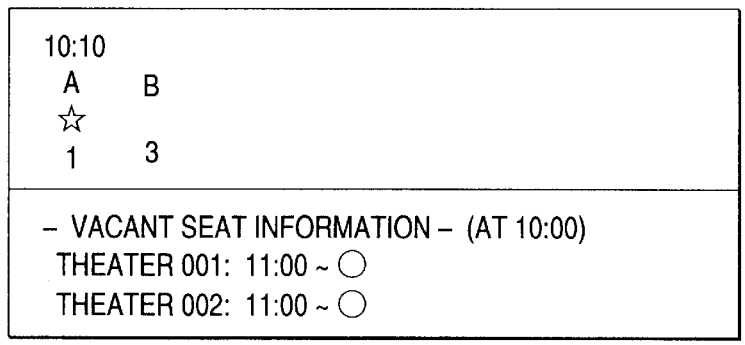
FIGS. 3A to 3D are views showing display examples on the display screen in another operation according to the first embodiment.
Figure 3B:
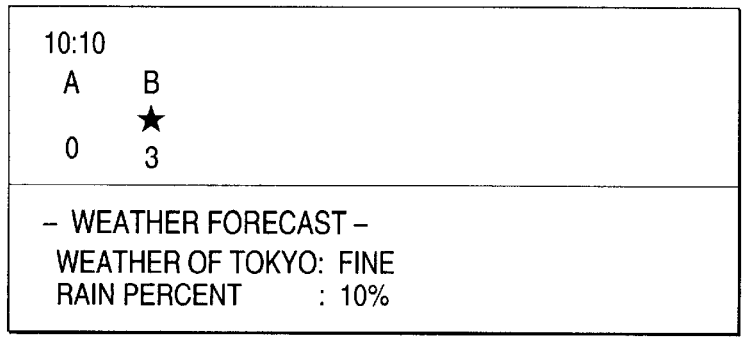

Under the screen display state in FIG. 3A, if the user issues the instruction by performing the display operation of the operating unit 6 to read the unread received messages of the "Vacant Seat Information" and then read the unread received messages of the "Weather Forecast", the screen display shown in FIG. 3B can be generated. Here the piece number "0" of the unread received message of the "Vacant Seat Information", the mark "★" indicating the unread received message of the "Weather Forecast", and the piece number "3" of the unread received messages are displayed, and the received messages of the weather forecast are displayed on the fifth line of the screen and thereunder.

As a result, the user can check that the piece number of the unread received message of the "Vacant Seat Information" is "0" and also the piece number of the unread received messages of the "Weather Forecast" is "3". Thus, the user can read the contents of three received messages displayed on the fifth line of the display unit 4 and thereunder. The advantages similar to those in FIG. 2 can be achieved by the operation example in FIG. 3. As a result, the user can always check easily the piece number of the unread received messages, which is effective for the user, every attribute and the convenience to handle can be improved.

In this case, other character strings or marks may be employed as the mark "★" indicating the unread received message of the "Weather Forecast". For instance, the screen display may be employed in which a pattern of an "Envelop Mark", etc. are displayed by the number corresponding to the unread piece number in combination with the information of the piece number of the unread received messages. One common mark may be employed on the screen display in place of assigning the marks "★" and "☆" indicating the unread received messages into respective attributes (vacant seat information/weather forecast, etc.).

Figure 3C:
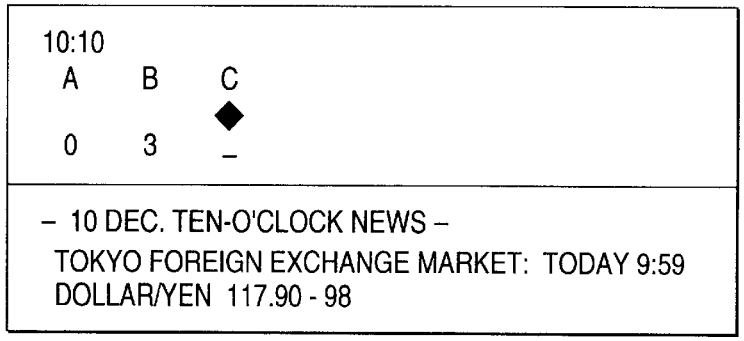

Further, like the screen display shown in FIG. 3C, when the piece number of the unread received messages is displayed for every attribute on the screen, a mark "♦" indicating the unread received messages may be displayed for the attributes such as the "news", etc., in which the user desires to read all unread received messages. Then the piece number of the unread received messages is shown as "−" so as not to be displayed on the screen. Otherwise, it is possible to display the piece number of all unread received messages on the screen regardless of the display operation by the operating unit 6.

Figure 3D:
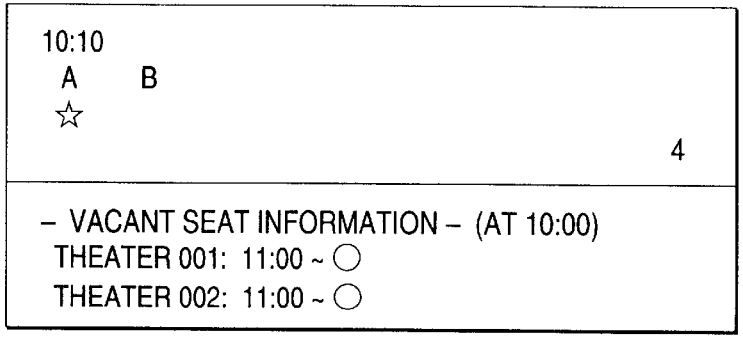

Also, not only the piece number of the unread received messages is displayed on the screen every attribute, but also a total sum of the piece number of the unread received messages for all attributes, e.g., "4" herein, may be displayed on the screen, like the screen display in FIG. 3D, instead of the screen display in FIG. 3A. Otherwise, the piece number of the unread received messages may be displayed every group in which the attributes are collected in any number.

In this manner, the screen display which is fitted for the situation can be selected by changing appropriately the screen display according to the employed situation, the choice of the user, etc. As a result, the convenience to handle can be improved.

Second Embodiment

Figure 4:
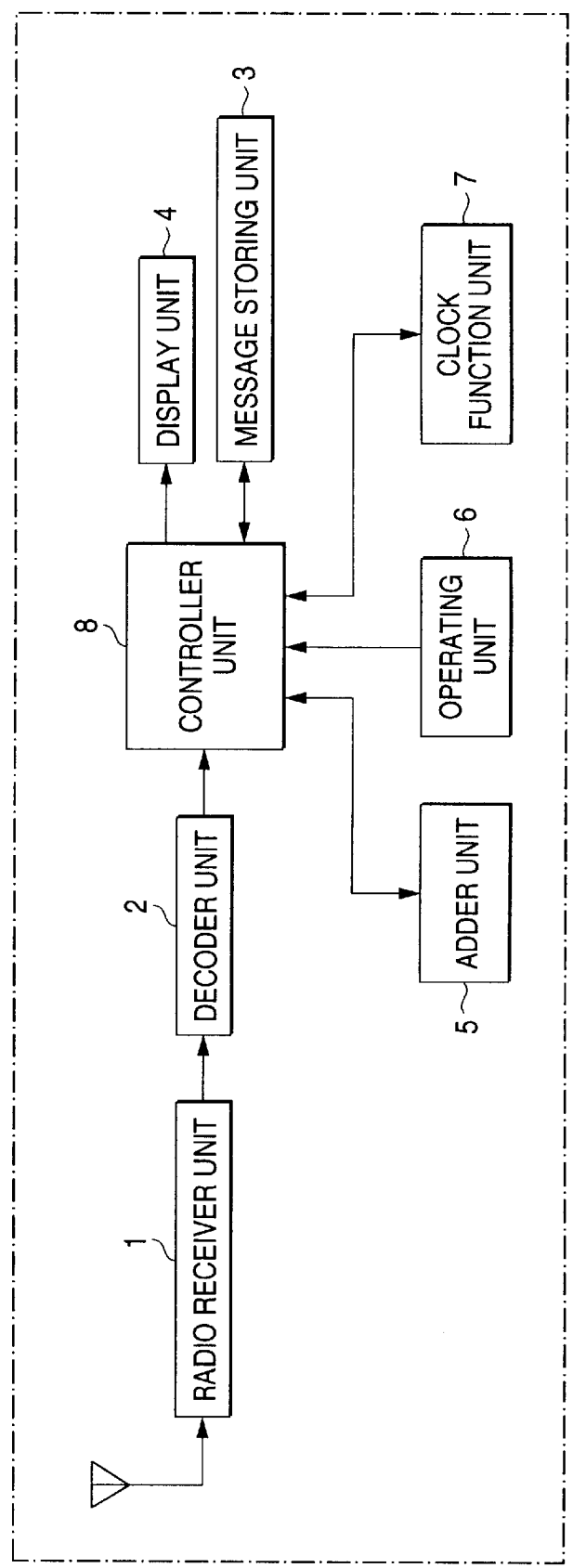
FIG. 4 is a block diagram showing a configuration of a radio selective-paging system according to a second embodiment of the present invention.

Next, a second embodiment of the present invention will be explained hereunder. FIG. 4 is a block diagram showing a configuration of a radio selective-paging system according to the second embodiment of the present invention.

Like the first embodiment shown in FIG. 1, the radio selective-paging system according to the second embodiment has the adder unit 5 for adding and counting the piece number of the received messages every attribute. In addition, a clock function unit 7 for counting an adding period to be added every attribute in the adder unit 5 is provided in answer to the second embodiment. Other configuration is similar to that in the first embodiment, and comprises the radio receiver unit 1, the decoder unit 2, the message storing unit 3, the display unit 4, the adder unit 5, the operating unit 6, and the controller unit 8.

In FIG. 4, operations of respective units, except the clock function unit 7, are similar to the first embodiment. The clock function unit 7 counts the adding period in the adder unit 5 for every attribute.

Next, an operation of the second embodiment of the present invention will be explained in detail hereunder. FIG. 5 is a view showing display examples on a display screen in an operation according to the second embodiment. Here the case is explained as an example where the vacant seat information of the theaters among various information services provided is displayed as the received message.

In FIGS. 4 and 5, in the second embodiment, the adding period in the adder unit 5 is set when the piece number of the unread received messages is counted, as described in the first embodiment. For example, following screen displays are conducted.

(1) the piece number of the messages received newly from a set time, (2) the piece number of the messages received newly until the set time, (3) the piece number of the messages received newly from a set time A to a set time B, and (4) the piece number of the messages received newly within a period except the period from the set time A to the set time B.

Also, the adding periods are set every attribute and the piece number of the messages received newly every attribute can be displayed on the screen.

In FIG. 5A, a current time, a start time "10:00", an end time "10:15", and an operation "Addition" in the adder unit 5 are set onto the clock function unit 7 by the setting operation of the operating unit 6. FIG. 5A is the screen display at the current time "10:10". At this time, like the examples in FIGS. 3 and 4, the category mark "A" indicating the information attribute on the current screen is displayed on the second line of the screen, and the mark "☆" indicating that the received message has not been read yet is displayed on the third line of the screen. Further, the numeral "1" which is the piece number of the unread received messages counted by the adder unit 5 is displayed on the fourth line of the screen. The information contents of the received messages are displayed from the fifth line to the seventh line below the lateral line of the screen. In this example, "Vacant Seat Situation at a time 10:00 in the Theater 001 and the Theater 002" is displayed on the screen.

Under the display state of the screen in FIG. 5A, when the user applies the already-read instruction operation, which indicates that the received message being displayed on the screen has been read by the user, to the operating unit 6 as the display operation, the mark "☆" displayed on the third line to indicate that the received message has not been read yet is cleared, and thus the piece number of the unread received messages displayed on the fourth line is changed into "0", as shown in FIG. 5B. The screen display in FIG. 5C shows that, at current time "10:20", six new messages have been received since the screen display in FIG. 5B was displayed, but four messages have also been received after the end time "10:15". The piece number of the unread received messages on the fourth line is displayed as "6" on the screen.

In this case, "Vacant Seat Information" which the user wishes to know has been received until the end time "10:15", and the piece number of the unread messages received from the start time "10:00" to the end time "10:15" is "6". In addition, the mark "☆" indicating that the received messages have not been read yet is not added to the received messages other than those received during the adding period. No mark may be displayed, or another mark "o", etc. may be displayed separately.

Unlike the embodiments shown in FIGS. 5A to 5C, the embodiment shown in FIG. 5D shows the case where the start time "10:00", the end time "10:15", and "Addition-free" as the operation in the adder unit 5, in which the received messages are not counted, are set. Similar to the screen display shown in FIG. 5B, the screen display in FIG. 5D initially had a piece number of the unread received messages at the time "10:10" that had become "0". Then, similar to the circumstances that resulted in the screen display shown in FIG. 5C, six new messages are received between the times "10:00" and "10:15", and four further new messages are received between the end time "10:15" and the current display time "10:20". In this case, since the piece number "6" of the received messages received from the start time "10:00" to the end time "10:15" is not added, the piece number of the unread received messages shows "4" (10−6=4) which is the piece number of the unread received messages received from the start time "10:15" to the current display time "10:20".

In this manner, according to the second embodiment, since the adding period and the operation every attribute in the adder unit 5 can be set by the clock function unit 7, information of the adder unit 5 based on this setting are displayed on the screen. In the second embodiment, like the first embodiment, the user can always check easily the piece number of the unread received messages, which is effective for the user, every attribute among many information services such as the received messages, e.g., news, weather forecast, vacant seat information of the theaters, etc., in the radio selective-paging system, the user can easily find the necessary unread received messages, and the convenience to handle can be improved.

As described above, according to the radio selective-paging system and the display method therefor of the present invention, the message information are stored based on the received message signal, then stored message information are read and displayed according to the display operation, and then the piece number of the new message information received from the display operation to the succeeding display operation is displayed every attribute, otherwise the piece number of the message information received in the predetermined period is displayed. Therefore, the user can always check easily the piece number of the unread received messages, which is effective for the user, every attribute among the received messages in the provided information, and the user can easily find the necessary unread received messages, and the convenience to handle can be improved.

What is claimed is:

1. A radio selective-paging system comprising:
   a radio receive processing means for receiving a selective calling signal and a message signal and storing message information including attribute category information and a message based on the signal;
   a message display processing means for reading stored message information in response to a display operation to display such message information; and
   a piece number-of-message display processing means for displaying a piece number for a plurality of new message information received for at least one attribute category during a period from the display operation to a succeeding display operation,
   wherein the attribute category information, the message and the piece number are simultaneously displayed.

2. The radio selective-paging system according to claim 1, wherein the piece number-of-message display processing means further displays a mark to identify new message information received during the period from the display operation to the succeeding display operation, wherein the mark is simultaneously displayed with the attribute category information, the message and the piece number.

3. A radio selective-paging system comprising:
   a radio receiving means for receiving a selective calling signal and a message signal via radio;
   a message storing means for storing message information based on the message signal received by said radio receiving means;
   a displaying means for simultaneously displaying the message information and piece number information on a screen;
   an operating means for performing a display operation to display the message information on the screen;
   an adding means for adding and counting a piece number for a plurality of new message information received for at least one attribute category beginning after a previous message information has been displayed on the displaying means by the operating means until a succeeding display operation is performed; and a display controlling means for causing said displaying means to display the piece number counted by said adding means when the succeeding display operation is performed.

4. The radio selective-paging system according to claim 3, wherein the displaying means further displays a mark to identify new message information received during the period from the display operation to the succeeding display operation, wherein the mark is simultaneously displayed with the message information and the piece number.

5. A display method for a radio selective-paging system comprising:

a radio receiving step of receiving a selective calling signal and a message signal via radio;

a message storing step of storing message information including a text message based on the message signal received;

a displaying step of displaying the message information on a screen;

an adding step of adding a piece number of a plurality of new message information for at least one attribute category beginning after a previous message information has been displayed in response to a display operation until a succeeding display operation is performed, to obtain a count thereof; and a piece number-of-message displaying step of displaying the piece number when the succeeding display operation is performed, wherein the piece number and the message information are simultaneously displayed.

6. The display method according to claim 5, further comprising the step of displaying a mark to identify new message information received during the period from the display operation to the succeeding display operation, wherein the mark is simultaneously displayed with the message information and the piece number.

7. A display method for a radio selective-paging system comprising:

a radio receiving step of receiving a selective calling signal and a message signal via radio;

a message storing step of storing message information including attribute category information and a message based on the message signal received;

a displaying step of simultaneously displaying the attribute category information and the message on a screen;

an adding step performed by the radio selective-paging system of setting a predetermined adding period and then adding a piece number of a plurality of new message information received for at least one attribute category during the adding period; and a piece number-of-message displaying step of simultaneously displaying the piece number added above with the category attribute information and the message.

8. The display method according to claim 7 further comprising the step of displaying a mark a mark to identify new message information received during the period from the display operation to the succeeding display operation, wherein the mark is simultaneously displayed with the attribute category information, the message and the piece number.

9. A radio selective-paging apparatus comprising:

a radio receive processing unit for receiving a selective calling signal and a message signal and storing message information including a message based on the message signal;

a message display processing unit for reading stored message information in response to a display operation to display such message information; and a piece number-of-message display processing unit for displaying a piece number for a plurality of new message information received during a period from the display operation to a succeeding display operation, wherein the message information, including the message, and the piece number are simultaneously displayed.

10. The radio selective-paging apparatus according to claim 9, wherein the piece number-of-message display processing unit further displays a mark to identify new message information received during the period from the display operation to the succeeding display operation, wherein the mark is simultaneously displayed with the message information, including the message, and the piece number.

11. A radio selective-paging apparatus comprising:

a radio receiving unit for receiving a selective calling signal and a message signal via radio;

a message storing unit for storing message information including attribute category information based on the message signal received by said radio receiving unit;

a displaying unit for simultaneously displaying the message information, including the attribute category information, and piece number information on a screen;

an operating unit for performing a display operation to display the message information on the screen;

an adding unit for adding a piece number of a plurality of new message information received for at least one attribute category until a succeeding display operation is performed after the message information has been displayed based on the display operation of said operating unit; and a display controlling unit for causing said displaying unit to display the piece number counted by said adding unit when the succeeding display operation is performed.

12. The radio selective-paging apparatus according to claim 11, wherein the displaying unit further displays a mark to identify new message information received during the period from the display operation to the succeeding display operation, wherein the mark is simultaneously displayed with the message information, including the category attribute information, and the piece number.

* * * * *